United States Patent
Yount et al.

(10) Patent No.: US 10,654,047 B2
(45) Date of Patent: May 19, 2020

(54) MODULAR MAGNETIC OIL FILTERING PLUG

(71) Applicant: FilterMag International, Inc., Scottsdale, AZ (US)

(72) Inventors: Randy Yount, Scottsdale, AZ (US); Wayne Johnson, Phoenix, AZ (US)

(73) Assignee: FILTERMAG INTERNATIONAL, INC., Scottsdale, AZ (US)

( * ) Notice: Subject to any disclaimer, the term of this patent is extended or adjusted under 35 U.S.C. 154(b) by 169 days.

(21) Appl. No.: 15/886,618

(22) Filed: Feb. 1, 2018

(65) Prior Publication Data
US 2018/0221890 A1   Aug. 9, 2018

Related U.S. Application Data

(60) Provisional application No. 62/453,919, filed on Feb. 2, 2017.

(51) Int. Cl.
*B03C 1/28* (2006.01)
*F01M 11/03* (2006.01)
(Continued)

(52) U.S. Cl.
CPC ............ *B03C 1/286* (2013.01); *B03C 1/0332* (2013.01); *F01M 11/03* (2013.01);
(Continued)

(58) Field of Classification Search
CPC ... B03C 1/286; B03C 1/0332; B03C 2201/18; F01M 11/0408; F01M 11/03; F01M 2011/0416
See application file for complete search history.

(56) References Cited

U.S. PATENT DOCUMENTS

| | | | | | |
|---|---|---|---|---|---|
| 2,657,342 A | * | 10/1953 | Stem | ...................... | B03C 1/288 335/305 |
| 2,976,075 A | * | 3/1961 | Budreck | ................. | B03C 1/284 294/65.5 |

(Continued)

FOREIGN PATENT DOCUMENTS

WO    2008030707    3/2008

OTHER PUBLICATIONS

Duramag 2013 "What is Maximum Energy Product / BHmax and How Does It Correspond to Magnet Grade?" https://www.duramag.com/techtalk/tech-briefs/what-is-maximum-energy-product-bhmax-and-how-does-it-correspond-to-magnet-grade/ (Year: 2013).*

(Continued)

*Primary Examiner* — Liam Royce
(74) *Attorney, Agent, or Firm* — Hankin Patent Law, APC; Kevin Schraven; Anooj Patel

(57) ABSTRACT

A magnetic filtration device for installing as a replacement to a standard drain plug commonly positioned at the bottom of the reservoir. The magnetic filtration device may attract and capture magnetic (ferromagnetic) particulate circulating throughout a mechanical system. Applications for the device include engines, motors, pumps, compressors, gear boxes, transmissions, hydraulic systems, and generators. The magnetic filtration device may comprise a magnet core enclosed within a magnet casing, with additional magnetic rods affixed to and/or arranged around the magnet casing.

14 Claims, 15 Drawing Sheets

(51) Int. Cl.
 *F01M 11/04* (2006.01)
 *B03C 1/033* (2006.01)
(52) U.S. Cl.
 CPC ..... *F01M 11/0408* (2013.01); *B03C 2201/18* (2013.01); *F01M 2011/0416* (2013.01)

(56) References Cited

U.S. PATENT DOCUMENTS

| | | | |
|---|---|---|---|
| 3,371,790 A | | 3/1968 | Kudlaty et al. |
| 4,176,065 A | * | 11/1979 | Cook ................. B03C 1/28 209/223.1 |
| 4,564,448 A | | 1/1986 | O'Meara, Jr. |
| 4,642,183 A | | 2/1987 | Herbert |
| 5,043,063 A | * | 8/1991 | Latimer ............. B03C 1/284 210/222 |
| 5,314,625 A | * | 5/1994 | Farnelli ........... B01D 21/0009 184/6.25 |
| 2006/0278569 A1 | | 12/2006 | Meddock et al. |
| 2008/0149549 A1 | * | 6/2008 | Lee ................. B03C 1/288 210/223 |
| 2016/0137938 A1 | * | 5/2016 | Cox ................... B03C 1/02 210/222 |

OTHER PUBLICATIONS

The International Searching Authority, Notification of Transmittal of the International Search Report and the Written Opinion of the International Searching Authority for International Application PCT/US2018/016496; dated Aug. 20, 2018, United States.

* cited by examiner

MODULAR MAGNETIC OIL FILTERING PLUG

CROSS-REFERENCE TO RELATED APPLICATIONS

This U.S. Non-Provisional Patent Application claims the benefit of and priority to U.S. Provisional Patent Application No. 62/453,919, filed on Feb. 2, 2017, titled "MODULAR MAGNETIC OIL FILTERING PLUG", by co-inventors Randy Yount and Wayne Johnson, the contents of which are expressly incorporated herein by this reference and to which priority is claimed.

FIELD OF USE

This disclosure pertains to filtration of lubricating liquids used to reduce wear in machinery and equipment, more particularly to filter submicron to micron size magnetic particles entrained within the lubricating liquid.

BACKGROUND

Lubrication liquids, commonly a lubrication oil or other oil such as hydraulic oil, are often used in mechanical systems, such as gear boxes, transmissions, hydraulic systems, motors, pumps, compressors, and generators to protect interacting component surfaces from excessive wear. To eliminate the metallic particles that become entrained within the oil due to components shedding, many mechanical systems include a filtering system in conjunction with the lubricating liquid flow path of the system to remove such debris. However, some systems are isolated such that filtration is impractical or impossible, and thus, oil circulates unfiltered. When not removed, these metallic particles will freely circulate through the system until they are finally removed when the oil is drained. These particles may cause damage.

One particularly harmful type of foreign matter in lubricating oil is small metallic magnetic particulates which are created by frictional contact between moving metal parts of mechanical systems. The magnetic particulates are shards of metal from the metal parts of the mechanical system that are dislodged during operation. As oil is circulated to lubricate the various moving components, the metallic particles entrained in the oil are carried to be unwittingly interfaced between the moving components. At these locations, the hardness of the metallic magnetic particulates causes metal to bear against metal, and reliance is placed solely on the oil to maintain a lubricating film. When these metallic magnetic particulates are brought to the interfaces, damage to the adjoining surfaces is likely. This damage eventually results in a degradation of the close tolerances between the moving parts, causing a loss in operating efficiency and more frequent maintenance in the form of repairs. By some estimates, these metallic magnetic particulates are the cause of more than one-half of the wear in said systems.

Two solutions exist for removing these metallic particles from a closed lubrication system of mechanical systems. The first solution involves the permanent installation of a permanent magnet within the lubrication compartment to attract and hold magnetic particles until a later date at which they can be removed, such as a complete rebuild of the mechanical system. The second solution is to install a magnetic drain plug in the housing of the power transmission unit. The magnetic drain plug attracts magnetic particles in the vicinity of the plug as the lubricant passively travels by the device.

Magnetic drain plugs have existed for quite some time with the most common being similar in form to those outlined in U.S. Pat. Nos. 5,949,317 and 5,420,557 which simply have a small magnet fastened on the end or nested inside of the drain plug. Several disadvantages exist with such designs. First, the magnet does not project far beyond the plug and has limited surface area for particle capture. Second, the magnet does not extend very far into the liquid reservoir and therefore experiences limited exposure to the lubricant entraining the magnetic particles flowing throughout the mechanical system. Finally, when the mechanical systems are running, the flow of liquid throughout travels at a very high flow rate, so a common problem is the plug's inability to hold onto the magnetic particles during operations. The only particles collected for removal are those gathered shortly before the drain plug is removed and when the system is turned off. These magnetic drain plugs fail to provide significant functionality when needed the most.

Another magnetic bolt assembly is found in U.S. Pat. No. 5,564,526 which involves the installation of a magnetic attachment over the external head of a steel drain plug. The magnetic flux coming from the magnetic attachment is channeled through the steel drain plug and creates a magnetic field on the opposite end of the plug which is exposed to the lubricant reservoir. This design places the source of the magnetic field on the outside of the lubrication reservoir and severely limits the attraction and capture of magnetic particles within the lubrication fluid.

Accordingly, what is needed is a device that may more aggressively capture magnetic particles generated during the normal operation of mechanical systems.

SUMMARY

One embodiment may be a magnetic filtration device comprising: a magnet core; a magnet casing; one or more magnetic rods; and a plug body; wherein the plug body may comprise a plug head and a plug-reservoir engagement portion; wherein the magnet core may be substantially contained within the magnet casing; and wherein the one or more magnetic rods are arranged around an outer portion of the magnet casing. The magnet casing may comprise one or more ridges; wherein an outermost portion of the at least one ridge extends further from a center of the device than an outermost portion of the one or more magnetic rods. The magnetic filtration device may further comprise: an end cushion pad; wherein the end cushion pad may be between a distal end of the magnet core and a distal end of the magnet casing. The magnetic filtration device may further comprise: a filler spacer pad; wherein the filler spacer pad may be between a proximal end of the magnet core and the plug body. The magnetic filtration device may further comprise: an extension spacer; wherein the extension spacer may be connected on its proximal end to the plug body via a plug-extension engagement portion; wherein the extension spacer may be connected on its distal end to the magnet casing via a casing-extension engagement portion. The extension spacer may be non-magnetic. The extension spacer may be a length that causes the magnet core to be located inside a reservoir, typically for liquids, such as a lubricant, and not overlapping a wall of the reservoir. The plug body may be connected to the magnet casing via a plug-casing engagement portion. The plug body may be non-magnetic. The plug body comprises a plug head. The plug head comprises a hexagonal end. The plug head may comprise a security key. The magnet casing may be non-magnetic. The magnet core and the one or more magnetic rods may be made of a magnetic material selected from the group of magnetic material consisting of one or more of: Neodymium Iron Boron (Nd-Fe-B), Samarium Cobalt (Sm-Coy), Ferrite magnets, and combinations thereof. The magnetic material may have a magnet grade over 4 MGOe. A distal end of the magnetic filtration device may comprise a relatively weak magnetic field.

Another embodiment of a magnetic filtration device may comprise: a magnet core; a magnet casing, comprising a plurality of particle collection pockets and a plurality of ridges; and one or more magnetic rods; wherein the magnet core may be substantially contained within the magnet casing; wherein the one or more magnetic rods may be affixed to an outer portion of the magnet casing; wherein an outermost portion of the plurality of ridges extend further from a center of the device than an outermost portion of the one or more magnetic rods; wherein the device may be configured to attract a plurality of metal particles, such that the plurality of metal particles may be captured by the device and may be stored in the plurality of particle collection pockets. The magnetic filtration device may further comprise: a plug body; an end cushion pad; a filler spacer pad; and an extension spacer; wherein the magnet casing may be non-magnetic; wherein the plug body may comprise a plug head and a plug-reservoir engagement portion; wherein the end cushion pad may be between a distal end of the magnet core and a distal end of the magnet casing; wherein the filler spacer pad may be between a proximal end of the magnet core and the plug body; wherein the extension spacer may be non-magnetic; wherein the extension spacer may be connected on its proximal end to the plug body via a plug-extension engagement portion; wherein the extension spacer may be connected on its distal end to the magnet casing via a casing-extension engagement portion; wherein the extension spacer may be a length suitable to cause the magnet core to be located inside a reservoir, and not within a wall of the reservoir; wherein the plug body may be non-magnetic; wherein the plug body may comprise a plug head; wherein the plug head may comprise a hexagonal end; wherein the plug head may comprise a security key; wherein the magnet core and the magnetic rods may be made of a magnetic material selected from the group consisting of: Nd—Fe—B, Sm—Co, and Ferrite magnets; wherein the magnetic material may have a magnet grade over 4 MGOe; and wherein a distal end of the magnetic filtration device may comprise a relatively weak magnetic field not suitable for attracting and retaining magnetic particles.

Another embodiment of a magnetic filtration device may comprise: a magnet core; a magnet casing, comprising a plurality of particle collection pockets and a plurality of ridges; one or more magnetic rods; and a plug body; wherein the magnet core may be substantially contained within the magnet casing; wherein the one or more magnetic rods may be affixed to an outer portion of the magnet casing, such that an outermost portion of the plurality of ridges may extend further from a center of the device than an outermost portion of the one or more magnetic rods; wherein the plug body may be configured to be secured to a wall of a reservoir, such that the device may engage with a liquid in the reservoir; and wherein the device may be configured to attract a plurality of metal particles in the liquid, such that the plurality of metal particles may be captured by the device and may be stored in the plurality of particle collection pockets.

The device of the present disclosure may be an assembly of magnets that may be installed in place of a standard drain plug in order to attract and retain micron and submicron sized magnetic particles, also referred to as metallic magnetic particulates, entrained within a lubricant or other liquid.

The device of the present disclosure may have a varying number of component parts including a permanent magnet assembly, tube, filler spacer, cushion pad, soft magnetic rods, extension spacer, locking devices, and plug. The plug may screw into a drain hole and may be machined to accommodate any thread type or size. The extension spacer may connect the plug to the tube may allow the tube containing the magnets to be in a specific position within the lubrication fluid/oil reservoir. Depending on the wall thickness of the housing, the spacer length may be adjusted to position the tube flush with the inner wall of the housing. The tube may project into the fluid reservoir and may contain the permanent magnet assembly, cushion pad, and the filler spacer. The length of the tube and permanent magnet assembly may be different for each mechanical system and may depend on the geometry and position of other mechanical system components, such as gears. The magnetic field generated by the magnetic assembly may attract magnetic particles to the external surface of the tube where the magnetic particles may be captured. Soft magnetic rods, made of a material such as steel, may be mounted on the external surface of the tube contribute to concentrating the magnetic flux on the surface of the tube.

Maximum exposure to entrained magnetic particles may be obtained by having the tube and permanent magnetic assembly extend as far as possible into the mechanical system's interior. In doing so, careful consideration should be taken to avoid magnetizing gears or other components. Extending further into the fluid reservoir may create more surface area and exposure for particle capture by the permanent magnetic assembly. Soft magnetic rods may be mounted on the outside of the tube may be unique and contribute to concentrating the magnetic flux on the surface of the tube, and may limit the magnetic field's distance around the tube which may allow for the permanent magnetic assembly to be in closer proximity to internal components without magnetizing them. The device's modularity may enable customization to maximize efficiency in magnetic particle collection for a particular mechanical system. The length of the tube containing the magnet assembly may be adjusted to avoid maintain distance with components within the power transmission unit such as gears. Threads on the plug head may be different or modified to complement different mechanical systems. The number of magnets and the strength of the magnets may be adjustable to easily adjust the length of the magnetic attraction area.

Depending on the mechanical system, the permanent magnetic assembly contained inside the tube may be optimized for specific conditions. For example, the higher the flow rate of the lubrication liquid, the stronger the magnetic force may be on the surface of the tube in order to avoid the loss of particles due to being forcibly removed by the kinetic energy of the liquid. For high flow rate conditions, the magnetic circuit can be optimized by adjusting the magnet orientations, number of magnets, magnet dimensions, gap between magnets, and other characteristics to have a stronger magnetic field on the surface of the tube. In situations where fluid flow rates are slow, it may be advantageous to have the magnetic field extend out further into the surrounding liquid. Similarly, the magnetic circuit can be designed to meet this different set of conditions. Additionally, the magnetic circuit may be optimized to make particle removal easier for mechanics once the device is removed from operation. Minimizing the magnetic field strength at the end of the tube may reduce the effort required to remove captured particles from the device.

The rib guides may permit the use of large high energy product magnets (30-44 MGOe). Using strong magnets, combined with extending the length of the magnet, may make installation of the device difficult in certain situations because of attraction to cast iron or steel housing of the mechanical system. The permanent magnetic assembly contained by the tube may attract to the reservoir wall which may be steel or cast iron. Installation of the device may be done by guiding the ribs on the exterior of the tube housing which center the plug within the drain hole and maintain alignment as the plug is being threadably attached.

The contents of this summary section are provided only as a simplified introduction to the disclosure, and are not intended to be used to limit the scope of the claims. These, as well as other components, steps, features, objects, benefits, and advantages, will now become clear from a review of the following detailed description of illustrative embodiments, and of the claim.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

REFERENCE NUMERALS LIST

Figures 1A, 1B, 1C:
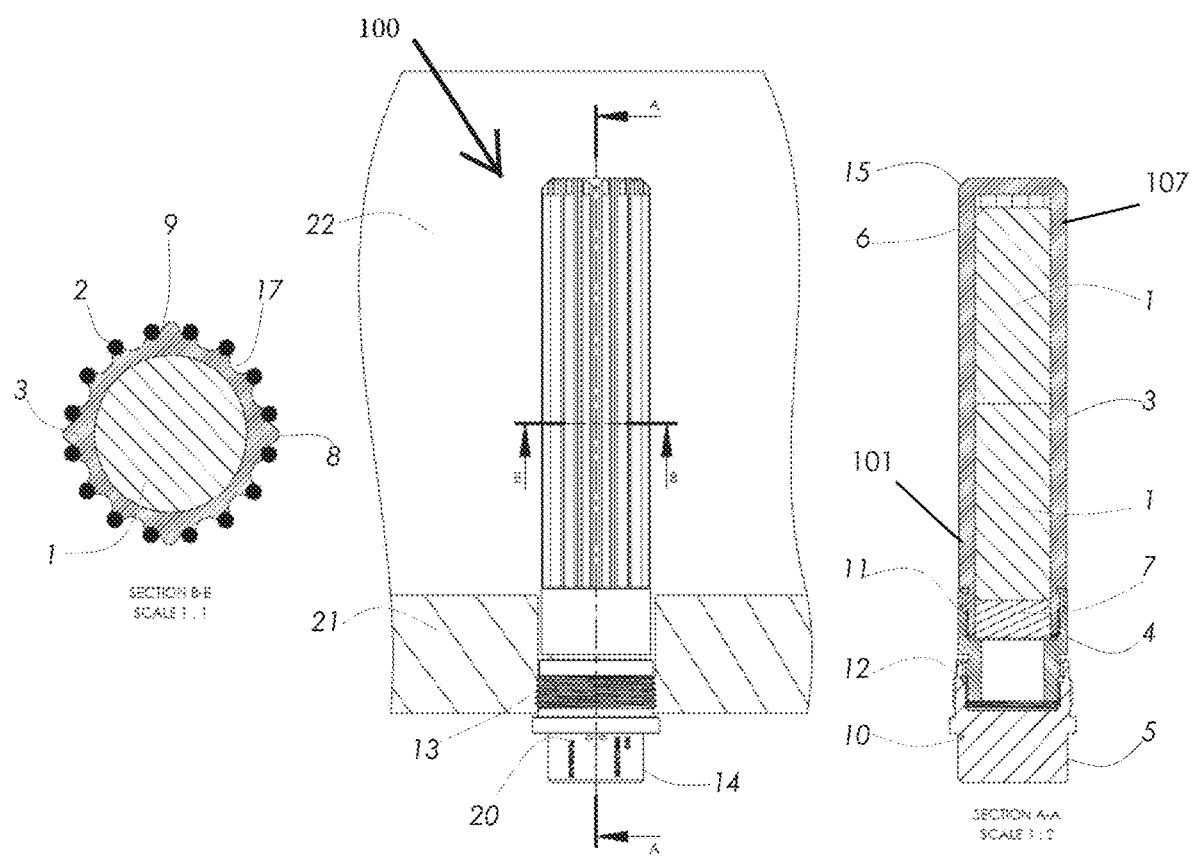
FIG. 1A-C are illustrations of a top, side, and side cross-section view taken along the line A-A and B-B, respectively, of one embodiment of a magnetic filtration device.

1: magnet core
2: magnetic rods
3: magnet casing
4: extension spacer
5: plug body
6: cushion pad
7: filler spacer pad
8: ridges
9: mounting site
10: tag mount
11: casing-extension engagement portion
12: plug-extension engagement portion
13: plug thread
14: plug head
15: magnet casing end
16: thread flange
17: particle collection pocket
18: security key
20: label
21: crank case wall
22: lubricant reservoir
23: magnetic flux line
24: magnetization direction
25: magnet retention
26: magnetic steel core

DETAILED DESCRIPTION OF THE ILLUSTRATIVE EMBODIMENTS

Before the present device, methods, and systems are disclosed and described, it is to be understood that the methods and systems are not limited to specific device and methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Various embodiments presented in terms of systems may comprise a number of components, modules, and the like. It is to be understood and appreciated that the various systems may include additional components, modules, etc. and/or may not include all of the components, modules, etc. discussed in connection with the figures. A combination of these approaches may also be used.

FIG. 1A-C are illustrations of a top, side, and side cross-section view taken along the line A-A and B-B, respectively, of one embodiment of a magnetic filtration device. As shown in FIG. 1A, which is a cross-section view along the line B-B of FIG. 1B, the magnetic filtration device 100 may comprise a magnet core 1, magnetic rods 2, magnet casing 3, ridges 8, mounting site 9, and particle collection pockets 17. The magnet core 1 may be a substantially cylindrical permanet magnet and may be encased by the magnet casing 3. The magnet casing 3 may comprise mounting sites 9 to which the magnetic rods 2 may be affixed. The magnet casing 3 may comprise ridges 8 and the ridges 8 may create the space that may be the particle collection pockets 17.

The magnet core 1 may be a Nd—Fe—B or Sm—Co magnet with a maximum energy product of over 30 MGOe, which may provide sufficient magnetic residual strength, intrinsic coercivity, resistance to the long-term effect of heat and oxidation, and physical strength to capture, and later release, particulate matter, such as metallic particles and/or magnetic particulates. In one embodiment the magnet core 1 may comprise Nd—Fe—B, and include an additional plating to protect the surface of the magnet core 1 against corrosion. The dimensions of magnet core 1 may be 0.25-4 inches in diameter and 0.25-6 inches in length. It may be larger or smaller. Alternative embodiments of the magnet core 1 may vary from these dimensions, and may be substantially any size depending on the nature of the intended use. The magnet core 1 may be a single rod, regimented rod, hollow tube, hollow segmented tube, or substantially any other elongated shape. The magnetization direction generated by the magnet core 1 may vary, and may be diametrical, radial, multipole, or radial segments. In one embodiment, the magnetic field at the distal end of the magnet casing 3 may be relatively weak in order to allow for removal of particulate matter collected by the device 100.

The magnetic rods 2 may be selected and positioned to create a specific magnetic field when used in conjunction with the magnet core 1. Specifically, the magnetic rods 2 and magnet core 1, when used in conjunction, may create a magnetic field that has specific locations where the magnetic field is strong or concentrated to allow for particle capture, retention, and removal. In one embodiment, the magnetic rods 2 may be a soft magnetic material with permeability >1, and there may be one or more magnetic rods 2. There may preferably be more than nine (9) magnetic rods 2. The magnetic rods may be substantially any shape, and may be affixed to the magnet casing 3 as individual rods or as pre-assembled onto a wire frame, which may then be affixed to the magnet casing 3. The magnetic rods 2 may be affixed to the mounting site 9 by brazing, welding, adhesive, physical clamp, or any other method of affixing a magnetic item to a non-magnetic surface.

The magnet casing 3 may comprise non-magnetic materials. In one embodiment, the magnet casing 3 may be stainless steel. The magnet casing 3 may be a tube having a cross section that is circular, square, triangular, octagon, multi-sided, or any other shape configured to receive the magnet core 1. The magnet casing 3 may comprise ridges 8, and mounting sites 9. The mounting sites 9 may be the portion of the magnet casing 3 to which the magnetic rods 2 may be affixed. The ridges 8 may extend further from a center of the magnet casing 3 than the outer portion of the magnetic rods 2. Although FIG. 1A shows the core 1 matingly fit into casing 3, the core 1 and case 3 do not have to fit matingly together and they may vary in shape.

As shown in FIG. 1B, the magnetic filtration device 100 may comprise a plug head 14, plug thread 13, and label 20. The plug head 14 may be hexagonal, or substantially any other shape suitable for use with tightening a threaded mechanism. Additionally, the plug head 14 may comprise a security key receiving portion 18 (shown in FIG. 9), wherein a specific and substantially unique shape is required to turn the plug head 14. In one embodiment, the plug head 14 may be greater than 0.25 inches in diameter.

The plug thread 13 of plug body 5 may be a thread configured to engage a wall 21 of a reservoir 22, such as a crank case. In alternative embodiments, the plug thread 13 may be replaced with any other mechanical or adhesive system for securing the magnetic filtration device 100 to a specific location on a machine. The label 20 may provide information relating to the magnetic filtration device 100.

As shown in FIG. 1C, which is a cross section view along the line A-A of FIG. 1B, the magnetic filtration device 100 may comprise a magnet core 1, magnet case 3, extension spacer 4, plug body 5, cushion pad 6, filler space pad 7, casing-extension engagement portion 11, plug-extension engagement portion 12, and magnet casing end 15. The magnet case 3 may have distal end 107 and proximal end 101.

The plug body 5 may comprise the plug head 14, plug thread 13, and tag mount 10. The plug body 5 may be reusable and modular. In a preferred embodiment, the plug body 5 may be 300 series stainless steel and may be less than 5 inches long. The tag mount 10 may be a hole or other anchoring mechanism to allow for identification markers to be affixed to the plug body 5.

The extension spacer 4 may be located between the magnet casing 3 and the plug body 5. The extension spacer 4 may be connected on its distal end to the magnet casing 3, and on its proximal end, to the plug body 5. The extension spacer 4 may be a length sufficient to cause the magnet core 1 to not be contained within the crank case wall 21. In a preferred embodiment, the extension spacer 4 may be 300 series stainless steel, or any other non-magnetic material. In other embodiments, the extension spacer 4 may be a magnetic material.

The cushion pad 6 may be located between a distal end of the magnet core 1, and the inside bottom magnet casing 3. The cushion pad 6 may be a relatively soft and compressible material, such that the cushion pad 6 may act as a buffer to prevent potential damage to the magnet core 4. Additionally, the cushion pad 6 may be used to prevent a magnetic field generated by the magnetic core from existing towards the distal end of the magnet casing 3, thereby allowing for removal of particulate matter collected by simply sliding particulate matter from the particle collection pockets 17 to the distal end of the magnet casing 3, where the magnetic field generated may be sufficiently weak so as to remove the collected particles/particulates.

The filler spacer pad 7 may be located at a proximal end of the magnet core 1 and distal end of the extension spacer 4. In one embodiment, the filler spacer pad 4 may extend into the extension spacer 4. The filler spacer pad 7 may be a non-magnetic material, such as stainless steel, aluminum, brass, plastic, or other material and may fill the space above the core 1 inside the case 3.

The casing-extension engagement portion 11 may comprise an outwardly threaded proximal portion of the magnet casing 3 and an inwardly threaded distal portion of the extension spacer 4, wherein the outwardly threaded and inwardly threaded portions are configured to engage one another. In an alternative embodiment, the inwardly and outwardly threaded portions may be reversed. In another alternative embodiment, the casing-extension engagement portion 11 may be substituted for a snapping, locking, welding, friction, magnetic, or any other any mechanical based engagement mechanism.

The plug-extension engagement portion 12 may comprise an outwardly threaded proximal portion of the extension spacer 4 and an inwardly threaded distal portion of the plug body 5, wherein the outwardly threaded and inwardly threaded portions are configured to engage one another. In alternative embodiment, the plug-extension engagement portion 12 may be substituted for a snapping, locking, welding, friction, magnetic, or any other any mechanical based engagement system or mechanism.

The magnet core 1 may compress the cushion pad 6 and filler spacer pad 7 as the casing-extension engagement portion 11 and plug-extension engagement portion 12 are engaged, thereby causing the magnet core 1 to be securely contained within the magnet casing 3. Additionally, if the magnet core 1 becomes physically damaged or fractured, the cushion pad 6 and filler spacer pad 7 may function to keep the magnet core 1 together, thereby preventing unexpected changes to the magnetic field.

The magnet casing end 15 may be shaped, rounded, sloped, or beveled, such that it may be used to guide the magnetic filtration device 100 into the crank case drain hole without catching on the hole. The ridges 8 may prevent the magnetic rods 8 from contacting, and thus being damaged by, the crank case 21 during installation or removal. The sloped magnet casing end 15 may center the magnetic filtration device 100 within the drain plug hole of the crank case 21 and may prevent the magnetic rods 2 from contacting the threaded walls of the drain plug hole of the crank case 21. This may also prevent magnetic particles collected by the magnetic filtration device 100 in pockets 17 from becoming dislodged from the magnetic filtration device 100 during removal. Additionally, centering the magnetic filtration device 100 may aid in properly threading the plug thread 13 into the threaded walls of the drain plug hole of the crank case. The ridges 8 may also protect the magnetic rods 2 from contacting the drain plug hole of the crank case 21. Furthermore, the ridges 8 may cause additional agitation and turbulence of the lubrication fluid/oil, which may allow for additional particulates to be captured and retained in the particle collection pockets 17.

The magnetic filtration device 100 may be installed in mechanical systems having moving parts. Specifically, the magnetic filtration device 100 may be installed in mechanical systems having moving parts and a lubrication fluid/oil reservoir, wherein operation of the mechanical system causes small particulates of the mechanical system to become dislodged from components of the mechanical system. These small particulates may cause additional wear and tear on the mechanical system, particularly in systems with tight tolerances, by interacting with various moving parts of the mechanical system, such as gears. The magnetic filtration device 100 may attract the small particulates that are attracted by magnetic fields generated by the magnet core 1 and magnetic rods 2, and then temporarily store (or capture) the small particulates in the particle collection pockets 17. A user may periodically remove the magnetic filtration device 100 from the mechanical system, such as during regular maintenance intervals, and physically remove substantially all of the particulates stored in or captured by the particle collection pockets 17. After the magnetic filtration device 100 has substantially all of the particulates stored in the particle collection pockets 17 removed, the user may re-install the magnetic filtration device 100 into the mechanical system. Accordingly, the magnetic filtration device 100 may be reusable. In one embodiment, the reservoir may retain lubrication oil, and the magnetic filtration device 100 may capture particulates that become entrained in the lubrication oil as that oil is circulated in the machine. In an alternative embodiment, the reservoir may retain hydraulic oil or other fluid, and the magnetic filtration device 100 may capture particulates that become entrained in the hydraulic oil, hydraulic fluid, liquid, or other fluid as that fluid is circulated in the machine.

In a preferred embodiment, the magnetic filtration device 100 may be installed in mechanical systems at a distance away from any magnetic components, such as gears and transmission, which may prevent magnetic interference with those mechanical systems.

Figure 2:
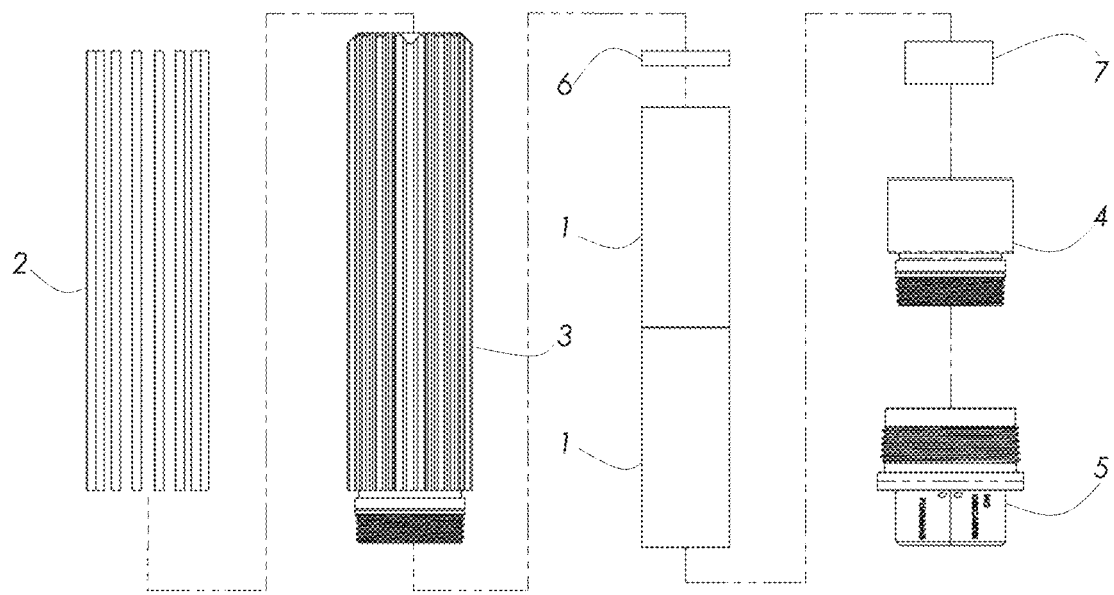
FIG. 2 is an illustration of an exploded view of one embodiment of a magnetic filtration device.

FIG. 2 is an illustration of an exploded view of one embodiment of a magnetic filtration device. As shown in FIG. 2, the magnetic filtration device 100 may comprise magnetic rods 2 on an outer most portion, a magnet casing 3, a magnet core 1, cushion spacer pad 6, filler spacer pad 7, extension spacer 4, and plug body 5. The magnet core 1, cushion spacer pad 6, and filler spacer pad 7 may be inserted substantially into the magnet casing 3. The magnetic rods 2 may be affixed to an outer portion of the magnet casing 3, and the extension spacer 4 may be threadedly engaged to the magnet casing 3 to secure the magnet core 1, cushion spacer pad 6 and filler spacer pad 7 inside the magnet casing 3. The extension spacer 4 may then be connected to the plug body 5.

Figure 3:
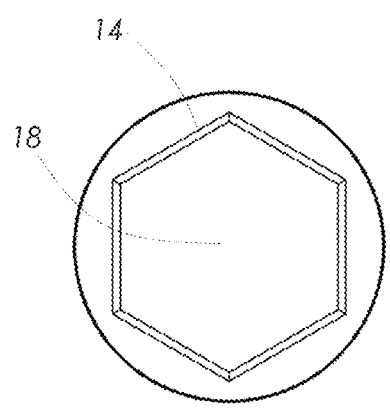
FIG. 3 is an illustration of a bottom view of one embodiment of a modular magnetic oil filtration device.

FIG. 3 is an illustration of a bottom view of one embodiment of a modular magnetic oil filtration device. As shown in FIG. 3, the plug body 5 may comprise a plug head 14 that may be hexagonal.

Figure 4:
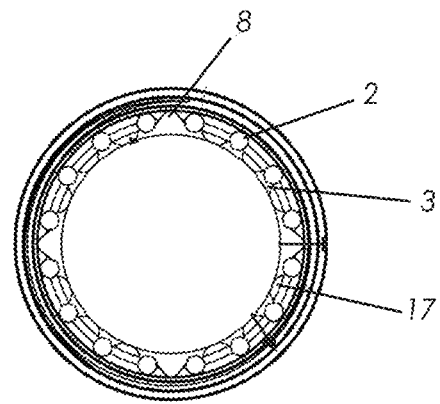
FIG. 4 is an illustration of a top view of one embodiment of a modular magnetic oil filtration device.

FIG. 4 is an illustration of a top view of one embodiment of a modular magnetic oil filtration device. As shown in FIG. 4, the outermost portions of the ridges 8 of case 3 may extend further from the center than the outermost portions of the magnetic rods 2.

Figure 5:
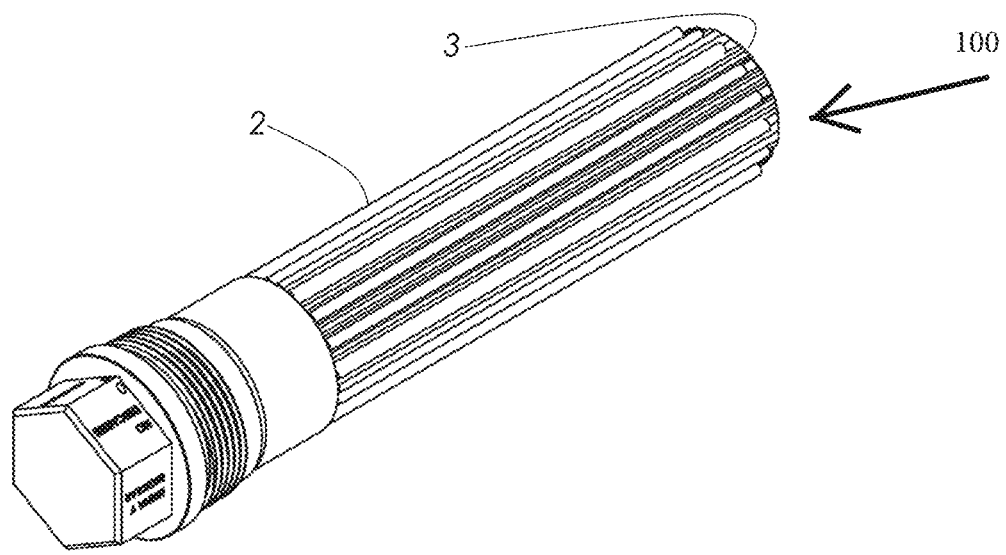
FIG. 5 is an illustration of a rear perspective view of one embodiment of a magnet assembly.

FIG. 5 is an illustration of a rear perspective view of one embodiment of a magnet assembly. FIG. 5 is a rear perspective view of one embodiment of a magnet filtration device 100. As shown in FIG. 5, the magnetic rods 2 may extend substantially along most of a length of the magnet casing 3, and in a preferred embodiment, the magnetic rods 2 may not extend along the entire length of the magnet casing 3.

Figure 6:
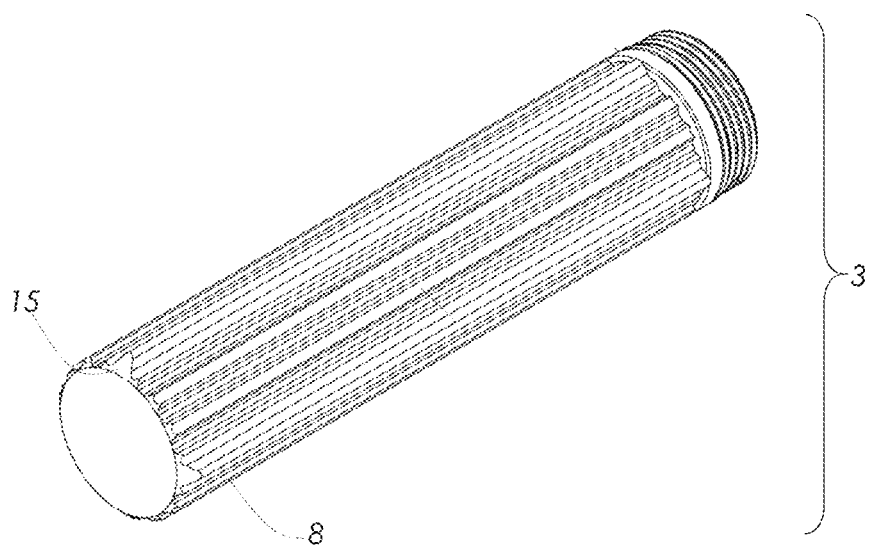
FIG. 6 is an illustration of a front perspective view of one embodiment of a magnet casing.

FIG. 6 is an illustration of a front perspective view of one embodiment of a magnet casing. FIG. 6 is a front perspective view of a magnet casing 3. As shown in FIG. 6, the ridges 8 may extend along the entire length of the magnet casing 3. In an alternative embodiment, the ridges 8 may not extend along the entire length of the magnet casing 3. FIG. 6 shows that the ridges and outer portion of casing 3 may be sloped or rounded 15 to allow for easier insertion of the device 100 into a hole.

Figure 7:
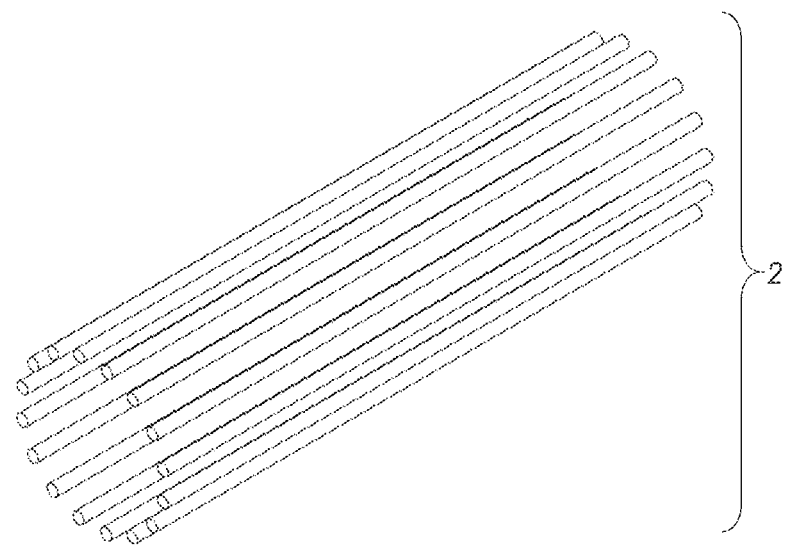
FIG. 7 is an illustration of a perspective view of one embodiment of magnetic rods.

FIG. 7 is an illustration of a perspective view of one embodiment of magnetic rods. As shown in FIG. 7, the magnetic rods 2 may be parallel to one another and arranged in an oval or circle.

Figure 8:
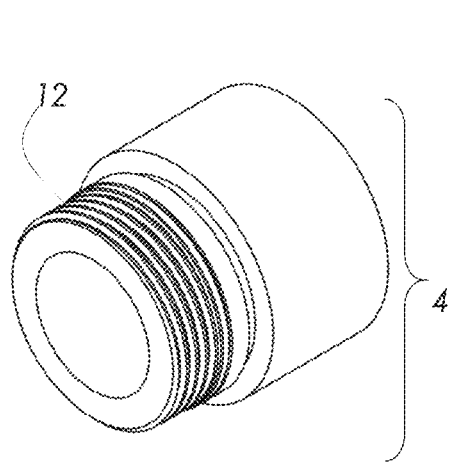
FIG. 8 is an illustration of a perspective view of one embodiment of an extension spacer.

FIG. 8 is an illustration of a perspective view of one embodiment of an extension spacer. FIG. 8 is a perspective view of an extension spacer 4 with plug-extension engagement portion 12.

Figure 9:
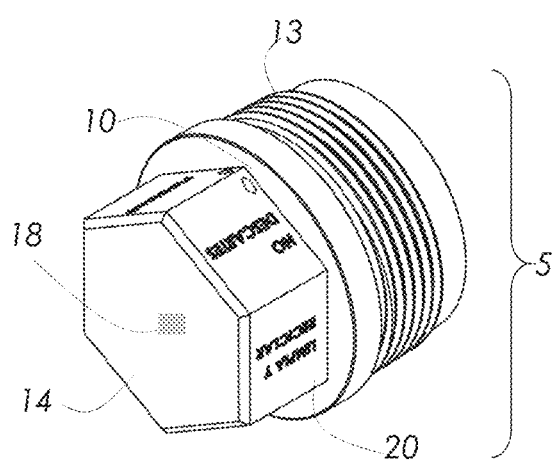
FIG. 9 is an illustration of a perspective view of one embodiment of a plug body.

FIG. 9 is an illustration of a perspective view of one embodiment of a plug body. FIG. 9 is a perspective view of a plug body 5, which may comprise a plug head 14, tag mount 10, plug thread 13, and label 20. The plug head 14 may be hexagonal, or substantially any other shape suitable for use with tightening a threaded mechanism. Additionally, the plug head 14 may comprise a security key receiving portion 18, wherein a specific and substantially unique shape is required to turn the plug head 14. In one embodiment, the plug head 14 may be greater than 0.25 inches in diameter.

Figure 10:
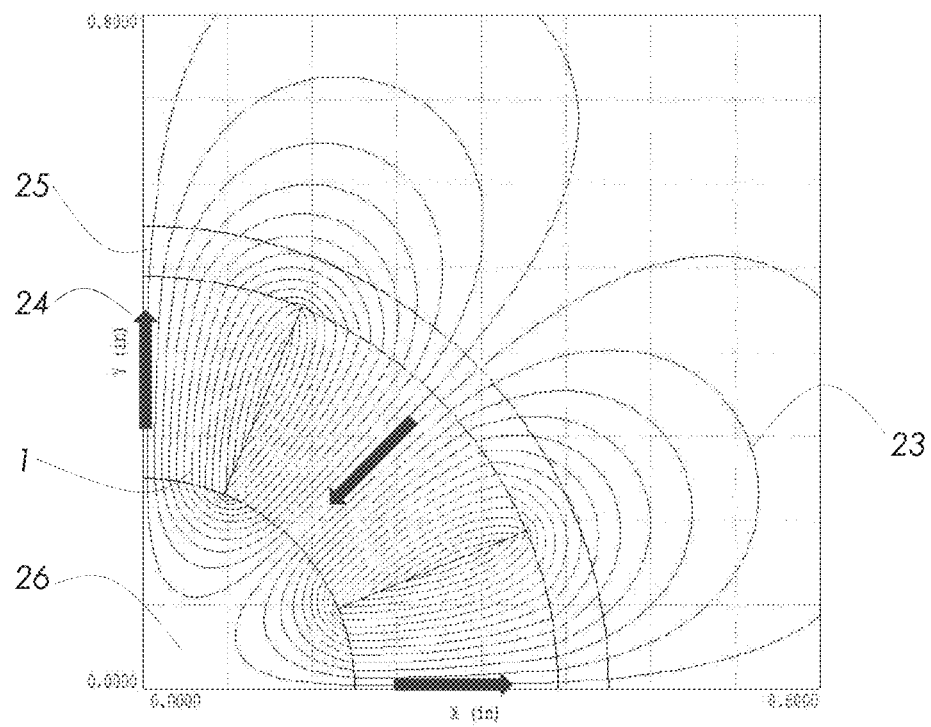
FIG. 10 is a quarter model example of one embodiment of an 8-segmented magnet with alternating arrangement and its magnetic field contour plot.

FIG. 10 is a quarter model example of one embodiment of an 8-segmented magnet with alternating arrangement and its magnetic field contour plot. This arrangement may be an example of a multipole permanent-magnet array. This arrangement causes a magnetic field energy in the oil of 3.69 J/m, while the integral of the field energy density gradient was 2,397 J/m$^2$. One potential drawback of multipole permanent-magnet arrays, as shown in FIG. 10, is that the field energy may be confined to a region near the magnet surfaces. FIG. 10 shows magnetization direction 24 (thick arrows), magnetic steel core 26, magnet core 1, magnet retention 25, and the various magnet flux lines 23.

Figure 11:
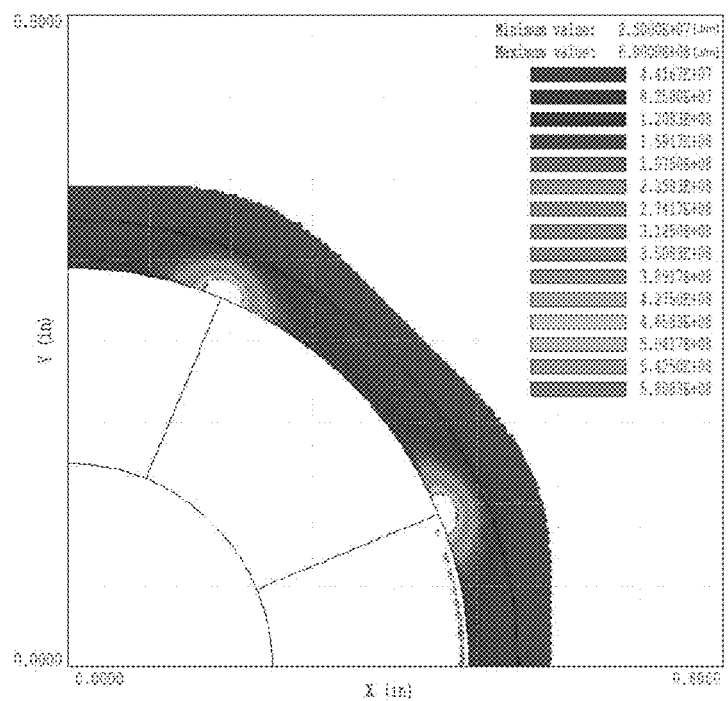
FIG. 11 is a magnetic field energy distribution plot of the example shown in FIG. 10.

FIG. 11 is a magnetic field energy distribution plot of the example shown in FIG. 10.

Figure 12:
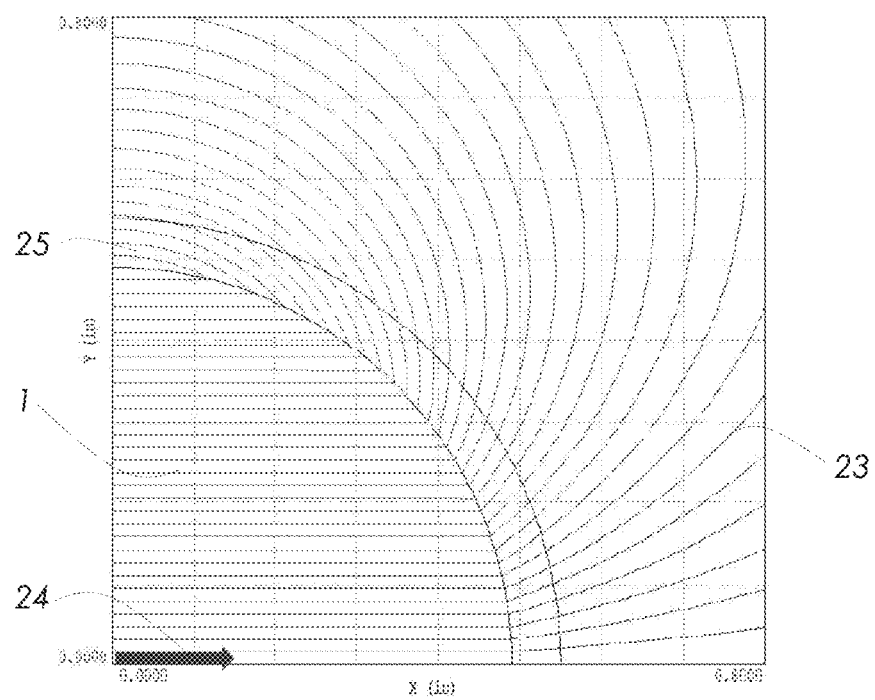
FIG. 12 is a quarter model example of one embodiment of single magnet with dipolar magnetization arrangement and its magnetic field contour plot.

FIG. 12 is a quarter model example of one embodiment of single magnet with dipolar magnetization arrangement and its magnetic field contour plot. This arrangement may be an example of a dipolar permanent-magnet. The magnetic field strength generated by a single rod dipole magnet may be greater than the magnetic field strength of the multipole array and magnetic steel core shown in other figures. FIG. 12 shows magnetization direction 24 (thick arrow), magnet core 1, magnet retention 25, and the various magnet flux lines 23.

Figure 13:
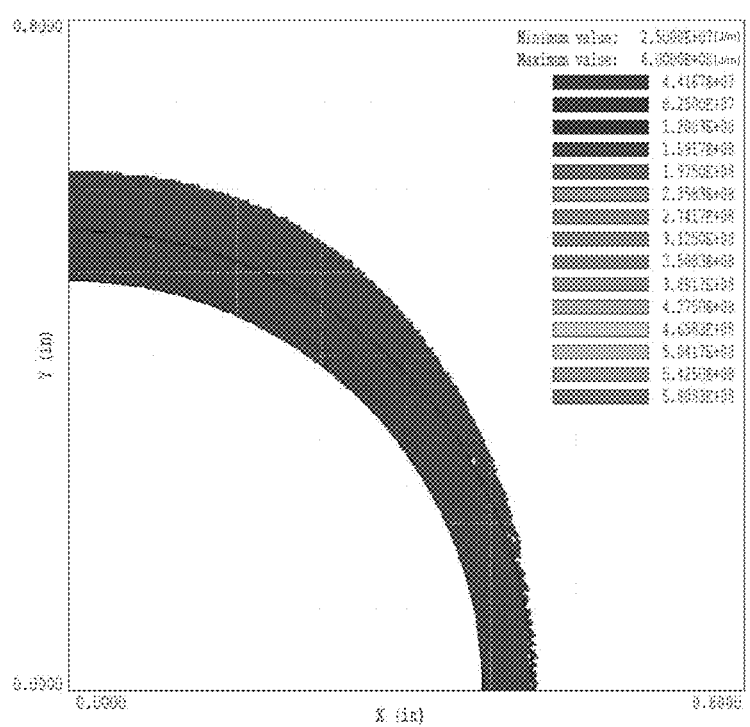
FIG. 13 is a magnetic field energy distribution plot of the example shown in FIG. 12.

FIG. 13 is a magnetic field energy distribution plot of the example shown in FIG. 12. The magnetic field energy in FIG. 13 was 18.75 J/m, which is over five times higher than that of the multipole assembly in FIG. 11. The volume integral of effective force was 3,582 J/m$^2$, about 50% higher than that of the multipole array. However, the effective force in FIG. 13 did not improve because the smoothly-varying field had low gradients.

Figure 14:
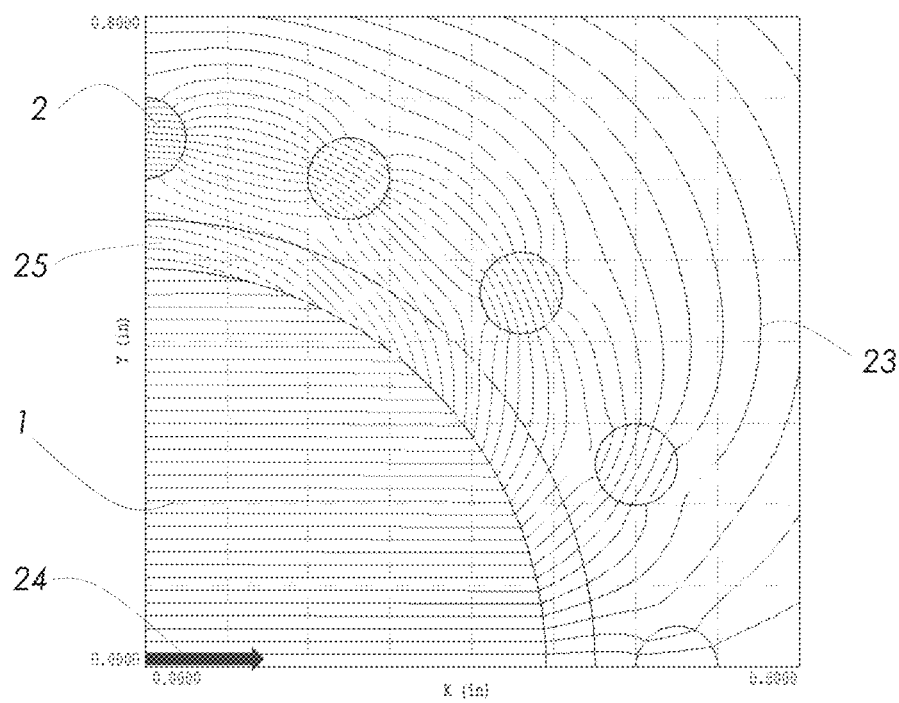
FIG. 14 is a quarter model example of one embodiment of magnetic rods and single magnet with dipolar magnetization arrangement and its magnetic field contour plot.

FIG. 14 is a quarter model example of one embodiment of magnetic rods and single magnet with dipolar magnetization arrangement and its magnetic field contour plot. FIG. 12 shows magnetization direction 24 (thick arrow), magnet core 1, magnet retention 25, the various magnet flux lines 23, and the magnetic rods 2. This arrangement may be an example of a dipolar permanent-magnet with magnetic rods. Thus, FIG. 14 shows a practical approach by adding spatial variations to the strong external field produced by the single dipole magnet magnetized along diameter. The magnetic rods 2 mounted on the magnet casing may produce spatial variations of flux density, which may increase effective force. In this example, the diameter of evenly-spaced rods 2 is 0.10 inch and the center of the rods are 0.65 inches from the center of a corresponding magnet core. The magnetic rods may be made of any magnetic steel with a saturation flux density of over two (2) Tesla.

Figure 15:
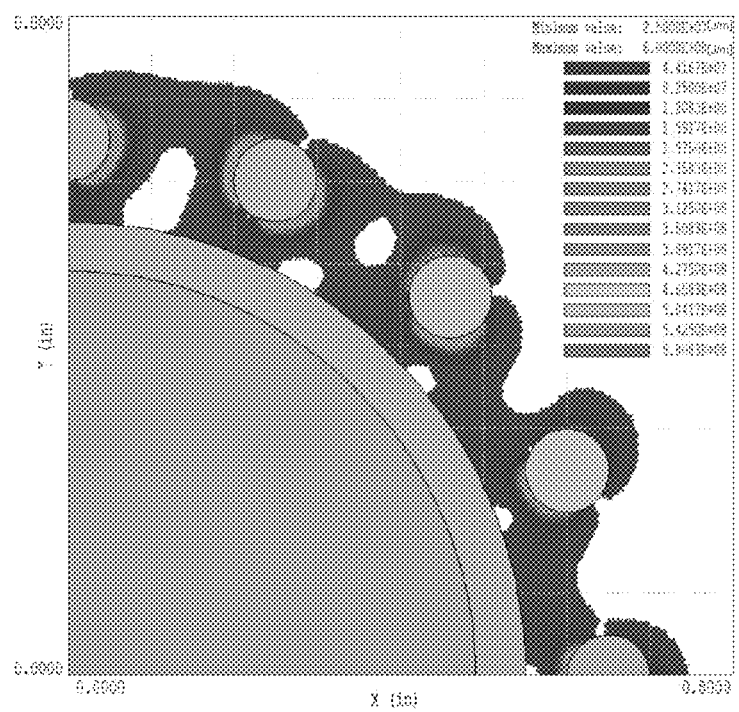
FIG. 15 is a magnetic field energy distribution plot of the example shown in FIG. 14 when the diameter of magnetic rods is 0.100 inch.

FIG. 15 is a magnetic field energy distribution plot of the example shown in FIG. 14. As shown in FIG. 15, the magnetic field region may extend into the oil or lubrication region of the mechanical system and areas of strong forces were observed on the magnetic rod surfaces. The volume-integrated field energy in the oil was 18.81 J/m and the integral of the effective force was 7,370 J/m$^2$ (three times higher than the value for the original multipole permanent-magnet assembly).

Figure 16:
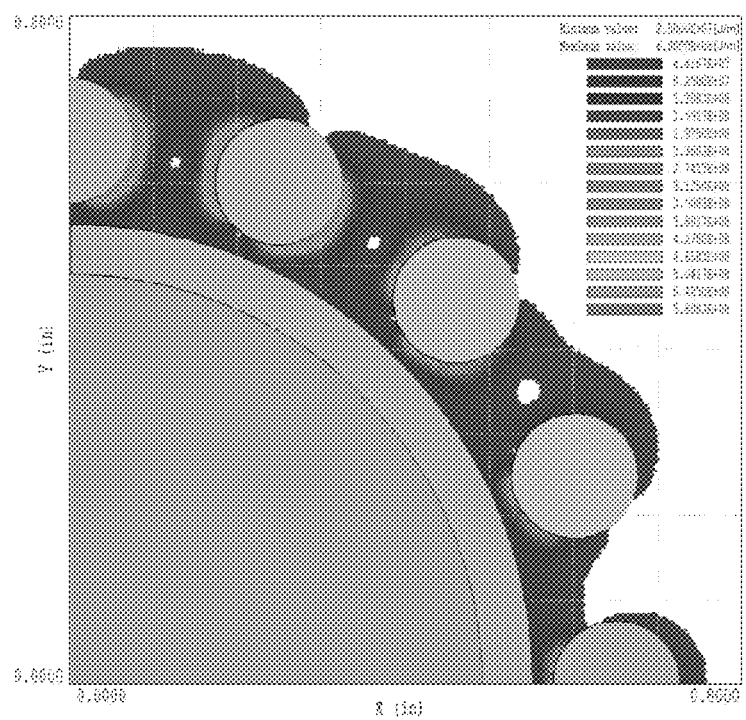
FIG. 16 is a magnetic field energy distribution plot of the example shown in FIG. 14 when the diameter of magnetic rods is 0.150 inch.

FIG. 16 is a magnetic field energy distribution plot of the example shown in FIG. 14 when the diameter of magnetic rods is 0.150 inch. FIG. 16 shows another calculation with larger rods diameter of 0.15 inch with centers at 0.65 inch, and indicates an enlarged collection area compared to FIG. 15. In this case, the effective force integral increased to 8,796 J/m$^2$. The higher forces may be balanced by a reduced circulation of oil, so a choice of the best option would depend on experimental results.

Figure 17:
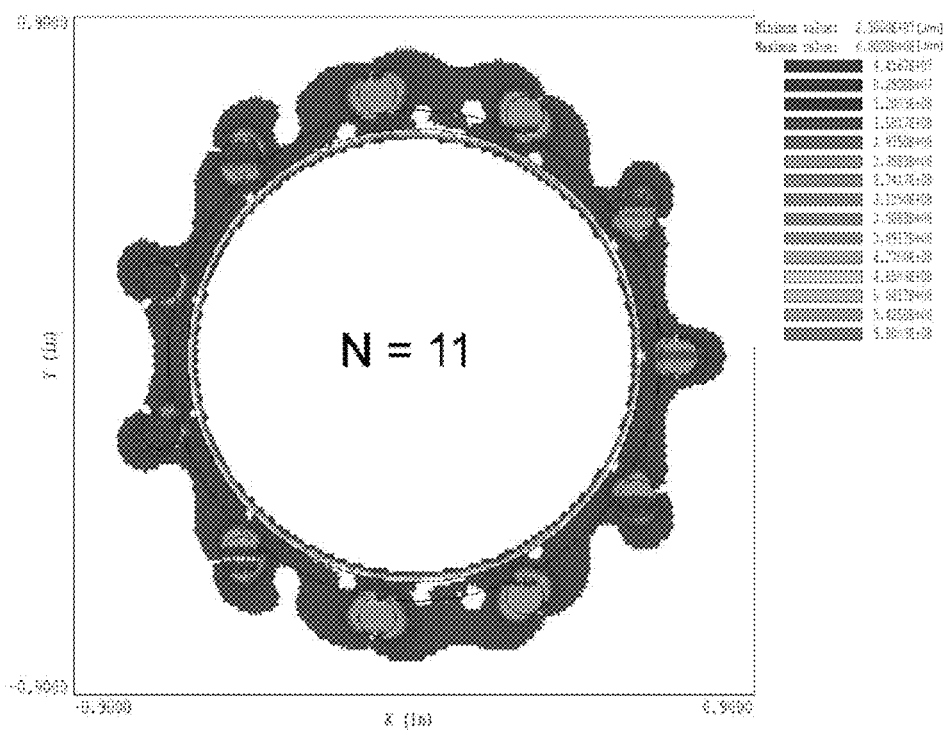
FIG. 17 is a magnetic field energy distribution plot of the example shown in FIG. 14 when the diameter of magnetic rods is 0.100 inch and the number of magnetic rods is 11.

FIG. 17 is a magnetic field energy distribution plot of the example shown in FIG. 14 when the diameter of magnetic rods is 0.100 inch and the number of magnetic rods is 11.

Figure 18:
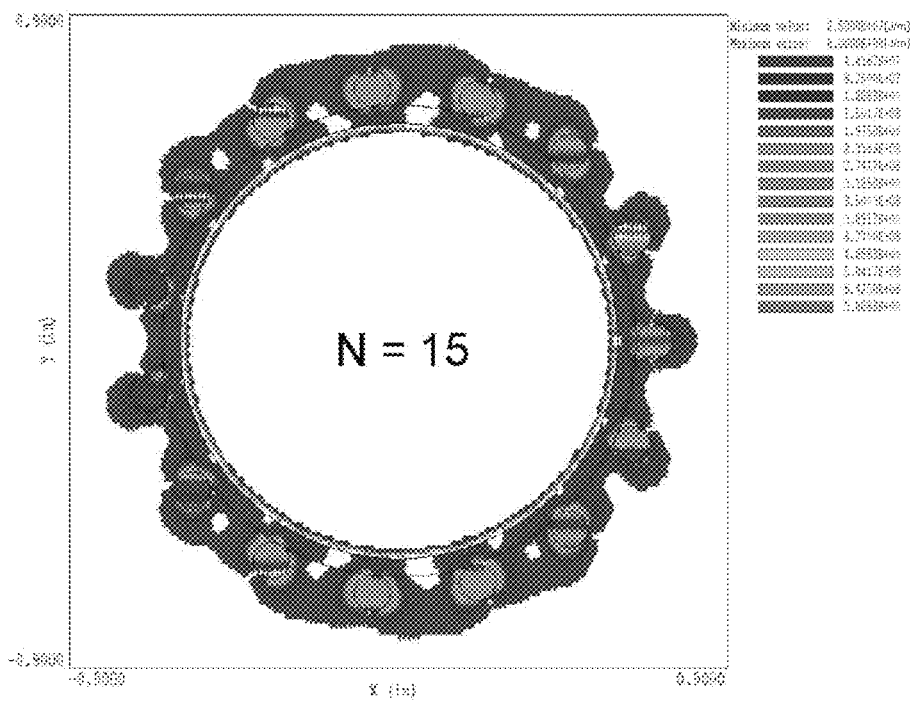
FIG. 18 is a magnetic field energy distribution plot of the example shown in FIG. 14 when the diameter of magnetic rods is 0.100 inch and the number of magnetic rods is 15.

FIG. 18 is a magnetic field energy distribution plot of the example shown in FIG. 14 when the diameter of magnetic rods is 0.100 inch and the number of magnetic rods is 15.

Figure 19:
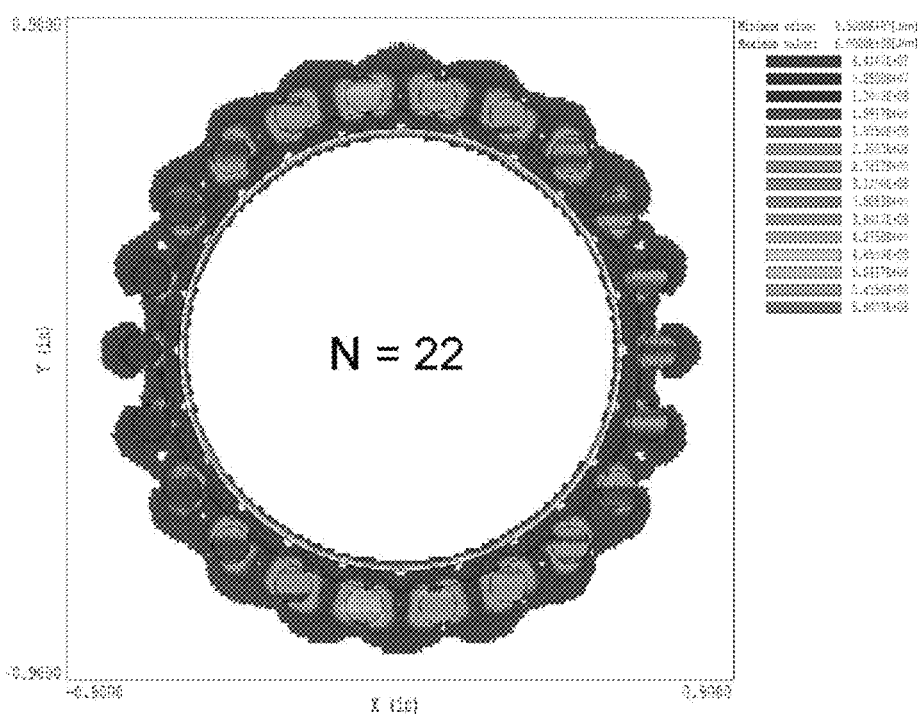
FIG. 19 is a magnetic field energy distribution plot of the example shown in FIG. 14 when the diameter of magnetic rods is 0.100 inch and the number of magnetic rods is 22.

FIG. 19 is a magnetic field energy distribution plot of the example shown in FIG. 14 when the diameter of magnetic rods is 0.100 inch and the number of magnetic rods is 22.

Figure 20:
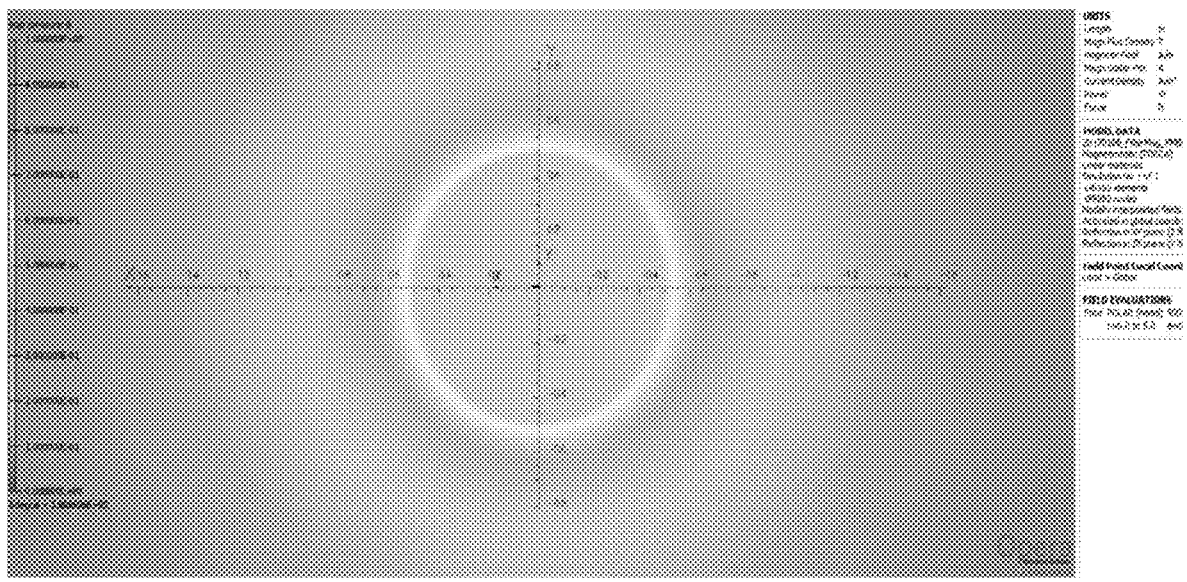
FIG. 20 is a magnetic field distribution plot of one embodiment of the standalone magnet without magnetic rods.

FIG. 20 is a magnetic field distribution plot of one embodiment of the standalone magnet without magnetic rods.

Figure 21:
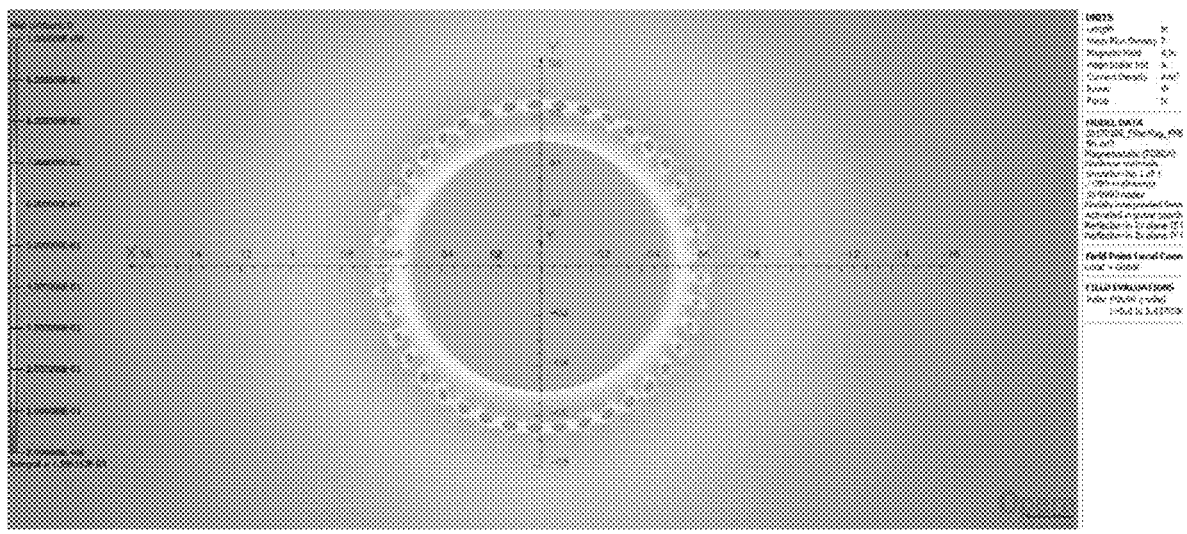
FIG. 21 is a magnetic field distribution plot of one embodiment on the symmetric plane with 41 magnetic rods when the diameter of magnetic rods is 0.05 inch.

FIG. 21 is a magnetic field distribution plot of one embodiment on the symmetric plane with 41 magnetic rods when the diameter of magnetic rods is 0.05 inch.

Figure 22:
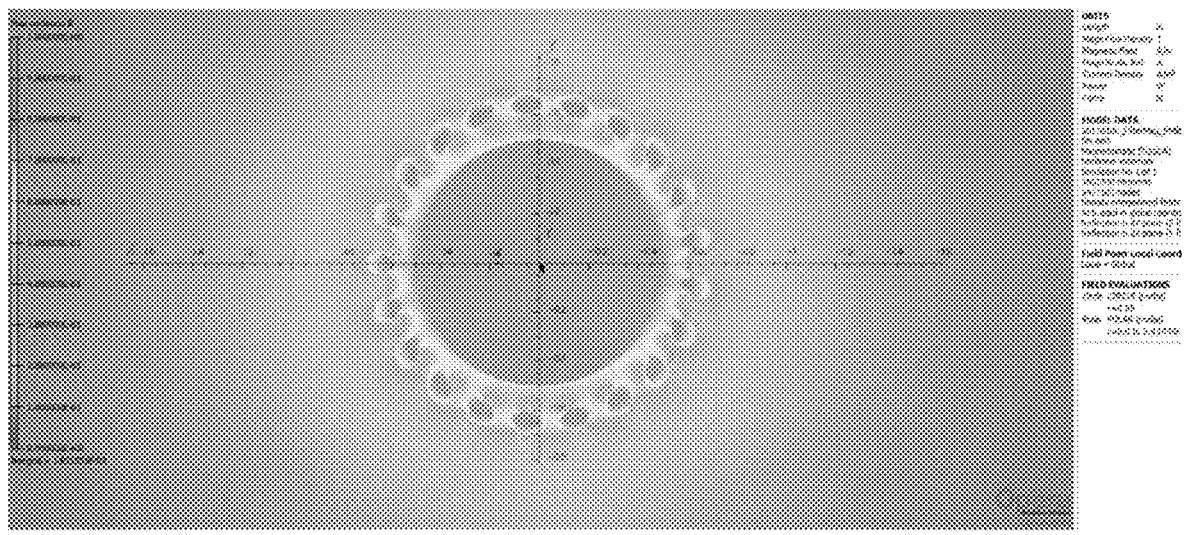
FIG. 22 is a magnetic field distribution plot of one embodiment on the symmetric plane with 21 magnetic rods when the diameter of magnetic rods is 0.1 inch and located at diameter of 1.3 inch.

FIG. 22 is a magnetic field distribution plot of one embodiment on the symmetric plane with 21 magnetic rods when the diameter of magnetic rods is 0.1 inch and located at diameter of 1.3 inch.

Figure 23:
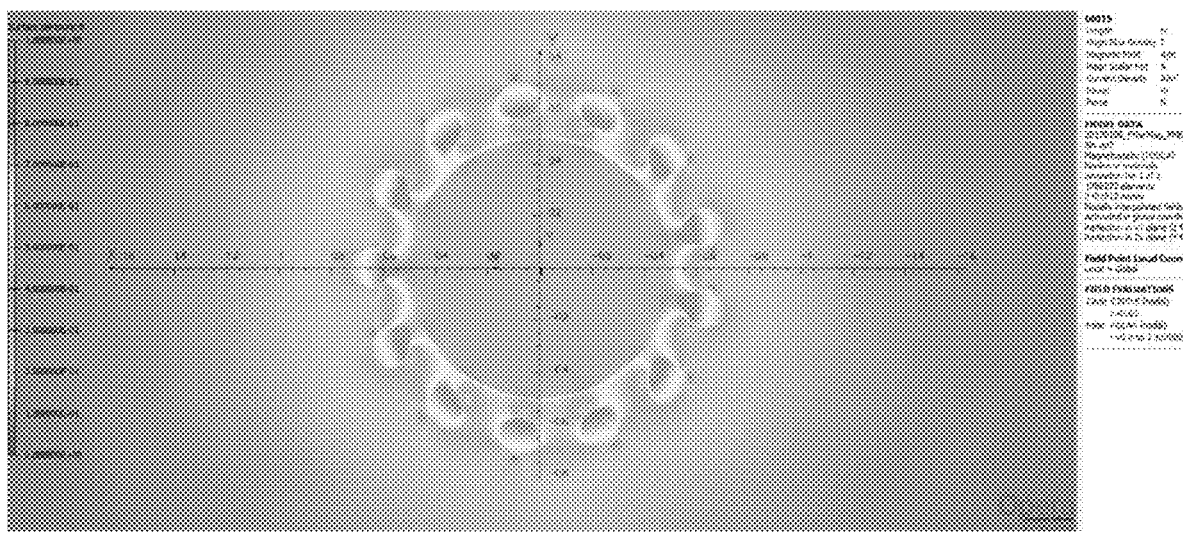
FIG. 23 is a magnetic field distribution plot of one embodiment on the symmetric plane with 13 magnetic rods when the diameter of magnetic rods is 0.15 inch.

FIG. 23 is a magnetic field distribution plot of one embodiment on the symmetric plane with 13 magnetic rods when the diameter of magnetic rods is 0.15 inch.

Figure 24:
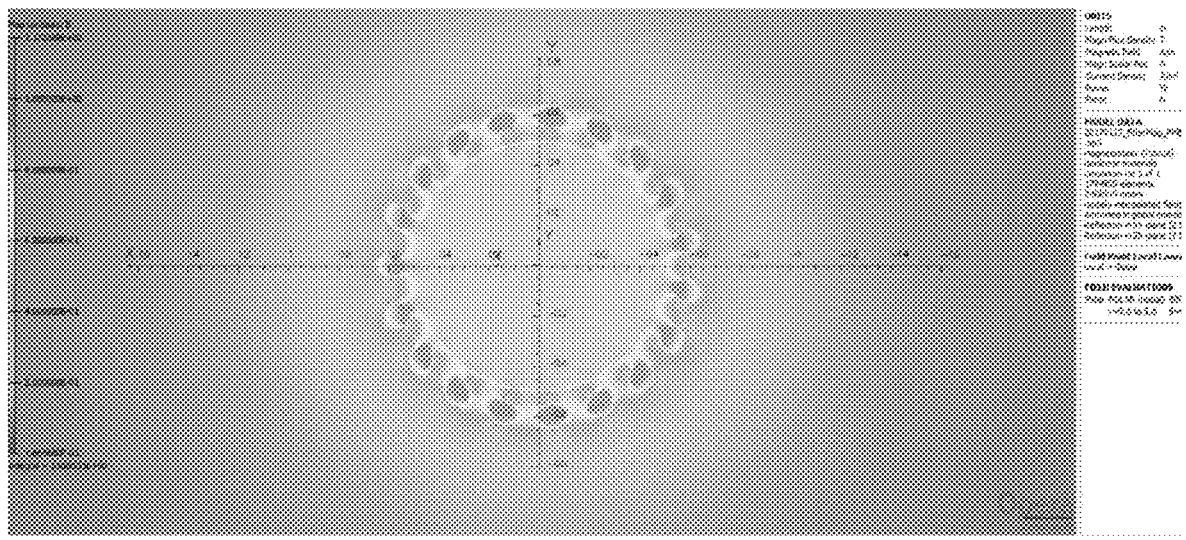
FIG. 24 is a magnetic field distribution plot of one embodiment on the symmetric plane with 19 magnetic rods when the magnetic rods are located at diameter of 1.2 inch.

FIG. 24 is a magnetic field distribution plot of one embodiment on the symmetric plane with 19 magnetic rods when the magnetic rods are located at diameter of 1.2 inch.

Figure 25:
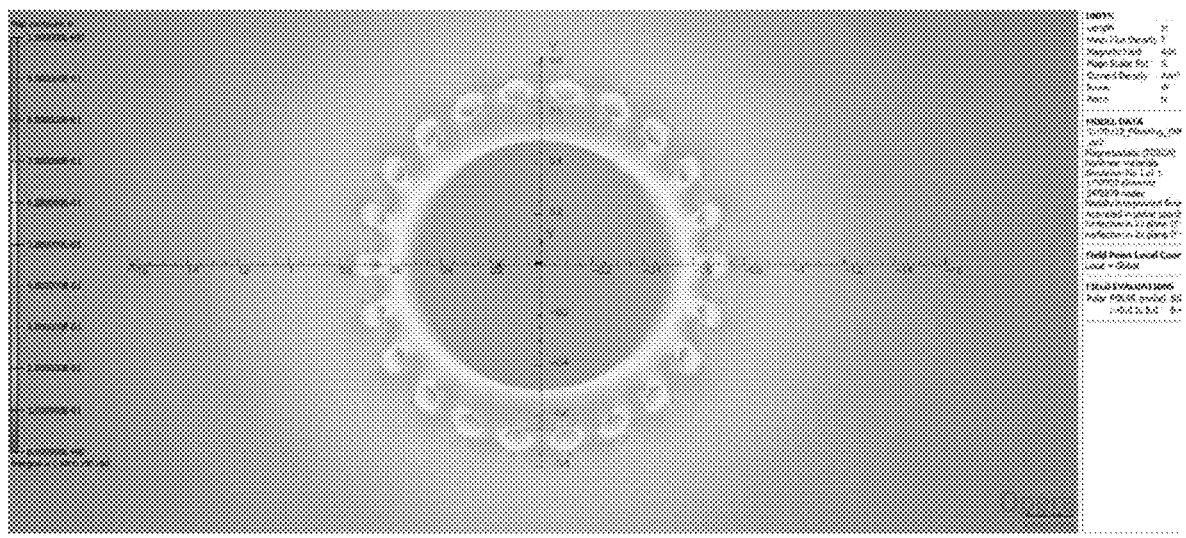
FIG. 25 is a magnetic field distribution plot of one embodiment on the symmetric plane with 22 magnetic rods when the magnetic rods are located at diameter of 1.4 inch.

FIG. 25 is a magnetic field distribution plot of one embodiment on the symmetric plane with 22 magnetic rods when the magnetic rods are located at diameter of 1.4 inch.

Case Study 1: The magnetic particle collection performance depends on the number of magnetic rods, N. As shown in FIG. 17, FIG. 18, and FIG. 19, for comparison, the effect of the number of magnetic rods on the magnetic field energy and magnetic force were investigated when the magnetic rod radius is 0.050 inch. As summarized in Table 1, hereinbelow, while the energy shows little variation with N, the magnetic force has a strong dependence. Higher values of N gave a higher force integral. On the other hand, there are two disadvantages of large values of N; 1) it may be difficult to wipe the resulting small gaps, and 2) although the force is stronger on the magnetic rod surfaces, the capture volume is reduced. The largest possible value of N corresponds to the magnetic rods touching each other. In this case, the magnetic rods would form a magnetic shield with little force in the oil volume.

TABLE 1

Calculation comparison depending on the number of magnetic rods (2D FEA)

| Rod radius (inches) | N | Field energy integral (J/m) | Force integral (kJ/m$^2$) |
|---|---|---|---|
| 0.025 | 0 | 137.0 | 20.4 |
|  | 31 | 141.8 | 47.0 |
|  | 46 | 141.9 | 61.1 |
|  | 69 | 141.9 | 101.0 |
| 0.050 | 0 | 120.0 | 19.57 |
|  | 15 | 119.1 | 35.38 |
|  | 22 | 118.6 | 45.17 |
|  | 29 | 118.2 | 56.56 |
| 0.075 | 0 | 90.5 | 15.45 |
|  | 9 | 98.3 | 27.41 |
|  | 14 | 97.3 | 35.71 |
|  | 18 | 96.3 | 42.52 |

Case Study 2: In this study, the effect of the magnetic rod diameter on the magnetic field energy and magnetic force were investigated when the magnet core diameter is 1 inch. Because the magnet core length is 4 inches, 3D FEA was conducted and magnetic field energy over the interested volume was calculated. There are two assumptions; 1) the magnetic rod position is located at 130% of magnet core diameter and 2) the spacing between magnetic rods is approximately same as the diameter of the magnetic rod (called '50% packing'). Simulations were performed with magnetic rod diameters equal to 5%, 10%, and 15% of magnet core diameter, whose results are shown in FIG. 21, FIG. 22, and FIG. 23, respectively. FIG. 20 has no magnetic rods for reference. As summarized in Table 2, the highest peak field is achieved at the smaller magnetic rod diameter (5% of magnet core diameter); however, the magnetic field energy around magnetic rods is greater at the largest magnetic rod diameter (15% of magnet core diameter), which is more important than peak field. In this example, it is concluded that the larger magnetic rod diameter provides better performance. The magnetic rod diameter may be limited by plug thread size.

TABLE 2

Calculation comparison depending on the magnetic rod diameter when the magnet core diameter is 1 inch (3D FEA)

| | | Rod position (inches) 1.3 (130% of magnet diameter) Rod diameter (inches) | | |
|---|---|---|---|---|
| | No rods (reference) | 0.05 (5% of magnet diameter) | 0.1 (10% of magnet diameter) | 0.15 (15% of magnet diameter) |
| Number of rods per 50% packing rule | 0 | 41 | 21 | 13 |
| Peak field in the gap at circle diameter 1.3" (Gauss) | 4,239 | 6,025 | 5,723 | 5,150 |
| Peak field in the rod at circle diameter 1.3" (Gauss) | 4,239 | 8,399 | 8,251 | 7,787 |
| Magnetic force integral in interested air volume (kJ/m$^3$) | 0.416 | 0.422 | 0.432 | 0.437 |
| Magnetic force integral increase (%) | 0 | 1.44 | 3.84 | 5.04 |

Case Study 3: In this study, the effect of magnetic rod locations on the magnetic field energy and magnetic force were investigated in 3D FEA when the magnetic core length is 4 inches. There are two assumptions; 1) the magnetic rod diameter is 0.1 inch (10% of magnet core diameter), and 2) the spacing between magnetic rods is approximately same diameter of magnetic rod (called '50% packing'). Simulations were performed with magnetic rod locations equal to 120%, 130%, and 140% of magnet core diameter, whose results are shown in FIG. 24, FIG. 22, and FIG. 25, respectively. FIG. 20 has no magnetic rods for reference. As summarized in Table 3, the highest peak field is achieved at the smallest magnetic rod location (120% of magnet core diameter); however, the magnetic field energy around magnetic rods is greater at the largest magnetic rod location (140% of magnet core diameter), which is more important than peak field. Thus, the further magnetic rod is located away from magnet core, the more magnetic field energy is contained around drain plug. The magnetic rods location would be limited by the plug thread size.

TABLE 3

Calculation comparison depending on the rod location when magnet diameter is 1 inch (3D FEA)

| | | Rod diameter (inches) 0.1 (10% of magnet diameter) Rod position (inches) | | |
|---|---|---|---|---|
| | No rods | 1.2 (120% of magnet diameter) | 1.3 (130% of magnet diameter) | 1.4 (140% of magnet diameter) |
| Number of rods per 50% packing rule | 0 | 19 | 21 | 22 |
| Peak field in the gap (Gauss) | 4,239 | 6,654 | 5,723 | 4,807 |
| Peak field in the rod (Gauss) | 4,239 | 9,766 | 8,251 | 6,910 |
| Magnetic force integral in interested air volume (kJ/m$^3$) | 0.416 | 0.423 | 0.432 | 0.437 |
| Magnetic force integral increase (%) | 0 | 1.68 | 3.84 | 5.04 |

It is to be understood that the optimum dimensional relationships for the parts of the device of the present disclosure, to include variations in number of magnetic rods, size, materials, shape, form, function and manner of operation, assembly and use, are deemed readily apparent and obvious to one skilled in the art, and all equivalent relationships to those illustrated in the drawings and described in the specification are intended to be encompassed by the device of the present disclosure. Therefore, the foregoing description of the device of the present disclosure can be modified to be used with other types of oil filters and applications to remove entrained magnetic particles from a circulating fluid in general. Consequently, the scope of the device of the present disclosure should not be limited to the foregoing description, but is to be defined by the appended claims and equivalents thereof.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A magnetic filtration device comprising:
a magnet core;
a magnet casing;
one or more magnetic rods;
a plug body; and
an extension spacer;
wherein said plug body comprises a plug head and a plug-reservoir engagement portion;
wherein said magnet core is substantially contained within said magnet casing; and
wherein said one or more magnetic rods are arranged around an outer portion of said magnet casing;
wherein said extension spacer is connected on its proximal end to said plug body via a plug-extension engagement portion; and
wherein said extension spacer is connected on its distal end to said magnet casing via a casing-extension engagement portion.

2. The magnetic filtration device of claim 1, wherein said magnet casing comprises one or more ridges;
wherein an outermost portion of said at least one ridge extends further from a center of said device than an outermost portion of said one or more magnetic rods.

3. The magnetic filtration device of claim 1, further comprising:
an end cushion pad;
wherein said end cushion pad is between a distal end of said magnet core and a distal end of said magnet casing.

4. The magnetic filtration device of claim 1, further comprising:
a filler spacer pad;
wherein said filler spacer pad is between a proximal end of said magnet core and said plug body.

5. The magnetic filtration device of claim 1, wherein said extension spacer is non-magnetic.

6. The magnetic filtration device of claim 5, wherein said extension spacer is a length that causes said magnet core to be located inside a reservoir, and not overlapping a wall of said reservoir.

7. The magnetic filtration device of claim 1, wherein said plug body is connected to said magnet casing via a plug-casing engagement portion.

8. The magnetic filtration device of claim 1, wherein said plug body is non-magnetic.

9. The magnetic filtration device of claim 1, wherein said plug head comprises a hexagonal end.

10. The magnetic filtration device of claim 9, wherein said plug head comprises a security key.

11. The magnetic filtration device of claim 1, wherein said magnet casing is non-magnetic.

12. The magnetic filtration device of claim 1, wherein said magnet core and said one or more magnetic rods are made of a magnetic material selected from the group of magnetic material consisting of one or more of: Neodymium Iron Boron (Nd-Fe-B), Samarium Cobalt (Sm-Coy), Ferrite magnets, and combinations thereof.

13. The magnetic filtration device of claim 12, wherein said magnetic material has a magnet grade over 4 MGOe.

14. A magnetic filtration device comprising:
a magnet core;
a magnet casing, comprising a plurality of particle collection pockets and a plurality of ridges;
one or more magnetic rods;
a plug body;
an end cushion pad;
a filler spacer pad; and
an extension spacer;
wherein said magnet core is substantially contained within said magnet casing;
wherein said one or more magnetic rods are affixed to an outer portion of said magnet casing;
wherein an outermost portion of said plurality of ridges extend further from a center of said device than an outermost portion of said one or more magnetic rods;
wherein said device is configured to attract a plurality of metal particles, such that said plurality of metal particles are captured by said device and are stored in said plurality of particle collection pockets;
wherein said magnet casing is non-magnetic;
wherein said plug body comprises a plug head and a plug-reservoir engagement portion;
wherein said end cushion pad is between a distal end of said magnet core and a distal end of said magnet casing;
wherein said filler spacer pad is between a proximal end of said magnet core and said plug body;
wherein said extension spacer is non-magnetic;
wherein said extension spacer is connected on its proximal end to said plug body via a plug-extension engagement portion;
wherein said extension spacer is connected on its distal end to said magnet casing via a casing-extension engagement portion;
wherein said extension spacer is a length suitable to cause said magnet core to be located inside a reservoir, and not within a wall of said reservoir;
wherein said plug body is non-magnetic;
wherein said plug body comprises a plug head;
wherein said plug head comprises a hexagonal end;
wherein said plug head comprises a security key;
wherein said magnet core and said magnetic rods are made of a magnetic material selected from the group consisting of: Neodymium Iron Boron (Nd-Fe-B), Samarium Cobalt (Sm-Co), and Ferrite magnets;
wherein said magnetic material has a magnet grade over 4 MGOe; and
wherein a distal end of said magnetic filtration device is configured to not be suitable for attracting and retaining magnetic particles.

* * * * *